Figure 1:
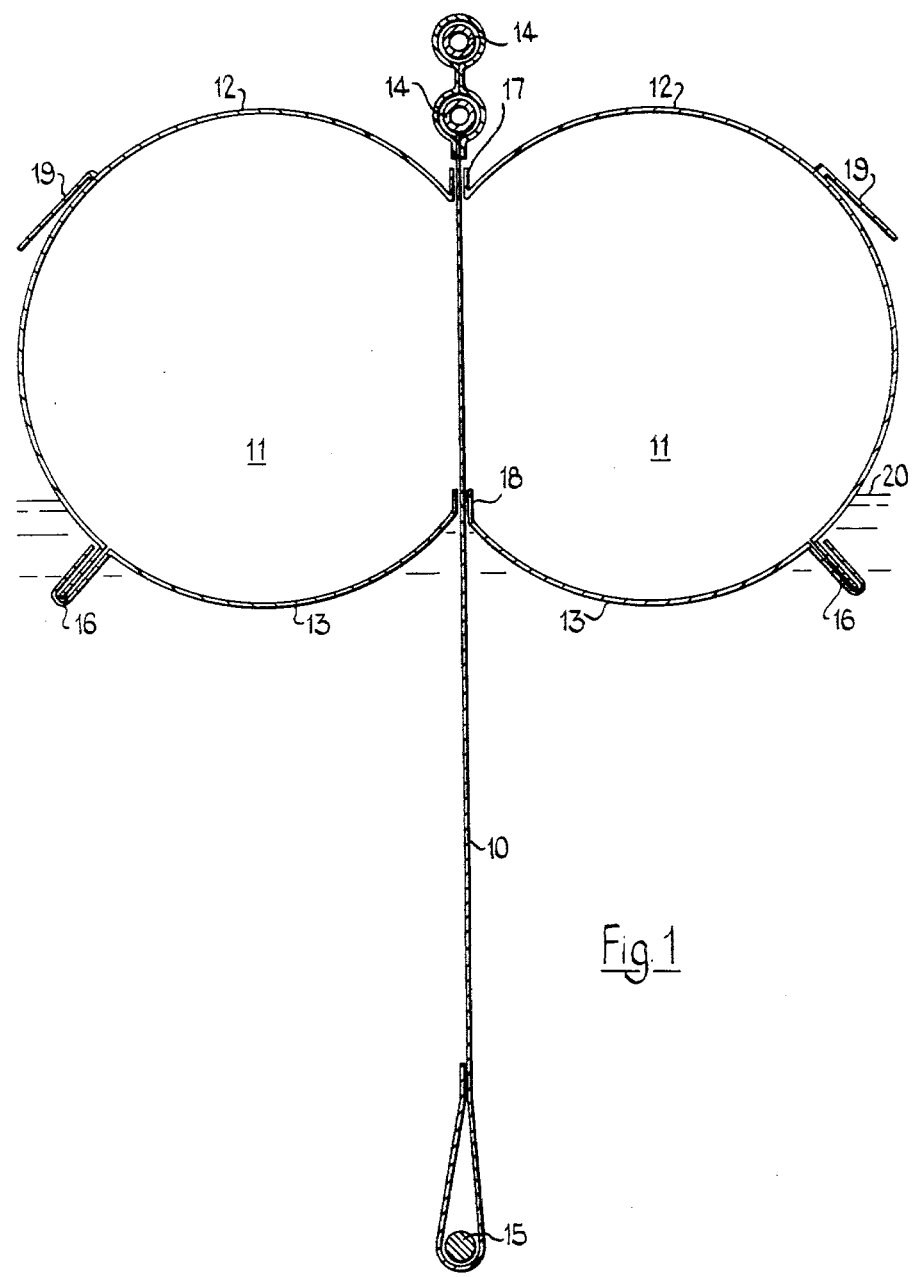

United States Patent [19]

Teasdale

[11] 4,325,653
[45] Apr. 20, 1982

[54] OIL CONTAINMENT BOOMS

[75] Inventor: Raymond G. Teasdale, Bath, England

[73] Assignee: National Reseach Development Corporation, London, England

[21] Appl. No.: 2,304

[22] Filed: Jan. 10, 1979

[30] Foreign Application Priority Data

Jan. 12, 1978 [GB] United Kingdom ............... 1318/78

[51] Int. Cl.³ .......................................... E02B 15/04
[52] U.S. Cl. .................................... 405/68; 114/267; 441/30
[58] Field of Search ............... 405/60, 61; 114/63–72, 114/264–267; 9/8 R, 8.3 R, 8.3 E

[56] References Cited

U.S. PATENT DOCUMENTS

| | | | |
|---|---|---|---|
| 3,494,132 | 2/1970 | Logan | 405/68 |
| 3,608,316 | 9/1971 | Manuel | 405/68 |
| 3,641,770 | 2/1972 | Fitzgerald | 405/68 |
| 3,859,796 | 1/1975 | Benson | 405/68 |
| 4,140,424 | 2/1979 | Bretherick | 405/68 |

FOREIGN PATENT DOCUMENTS 470555 9/1974 Australia ............................ 405/68

Primary Examiner—Trygve M. Blix
Assistant Examiner—D. W. Keen
Attorney, Agent, or Firm—Cushman, Darby & Cushman

[57] ABSTRACT

A design of an oil containment boom suitable particularly for stowage on a reel. The boom, in its inflated condition, is of "T" section having double buoyancy chambers and a central skirt member. The boom utilizes a tension wire in its lower skirt region and an air pressurizing hose in its upper skirt region above the buoyancy chambers. The geometry of the panels making up the chambers is arranged, together with the joints, to give a substantially flat deflated form. The air pressurizing hose and the tension wire are of comparable diameter each being of larger diameter than the maximum thickness of the deflated boom whereby undesirable folding and puckering of the boom material when wound up is accommodated in the lateral space between the hose and the wire.

21 Claims, 3 Drawing Figures

OIL CONTAINMENT BOOMS

This invention relates to oil containment booms.

The benefits of rapid oil containment are apparent to all engaged in oil pollution clearance, as oil slicks emanating from a point source rapidly spread and splinter into subsidiary slicks—usually into awkward corners and under pile jetties—where they are difficult to reach. The deployment time of currently available oil containment booms precludes their effective use in day to day pollution incidents. Much manpower is often needed to launch such booms and consequently they are thus rarely used as they would reach the incident site too late to play a useful part in any clearance operation.

The main advantage of a quickly deployable boom is that following early containment of a spillage the clearance authority can then decide whether to use dispersal or recovery techniques, a choice which is not usually available.

It is generally accepted that a heavy ballast is necessary at the boom-skirt bottom to enable the boom to function correctly. Such bulky ballast, traditionally a ballast chain, located at the bottom of the boom-skirt precludes the easy compact stowage of even conventional air inflated boom systems.

An object of the present invention therefore is to improve deployment characteristics and reduce the manpower involvement by stowing the oil boom on a reel which might be conveniently sited close to a jetty edge or on a floatation platform.

According to the present invention an oil containment boom comprises double side by side buoyancy chambers, a central skirt member depending downwardly from the buoyancy chambers, and air pressurising hose member extending longitudinally of the top region of the boom and a wire member extending longitudinally of the bottom region of the boom.

A single air pressuring hose member might be utilised to pressurise in use both buoyancy chambers although preferably each buoyancy chamber is served by its own individual air pressurising hose member. In this latter preferred arrangement the air pressurising hose members are each located in the central plane of the boom and skirt member. Each air pressurising hose member is in fluid connection with its respective buoyancy chamber at the end of the chamber remote from the source of pressurising air.

Conveniently the skirt member extends over the full effective depth of the boom, the upper portion of the skirt member providing a common separating wall between the buoyancy chambers. In this arrangement each buoyancy chamber is further bounded by discrete upper and lower wall portions, which are preferably attached together along their common peripheral edges to form a relatively stiff downwardly directed keel-like projection.

Advantageously the peripheral edge region of the upper and lower wall portions parallel to but remote from the keel-like projection are attached to the skirt member with their free edges extending towards the top of the skirt member so that with the chamber in the deflated condition the wall portions will lie naturally flat, or substanitally so, relative to the skirt member.

The depth of the upper and lower wall portions and the distance between their attachment to the skirt member is arranged to provide maximum compactness of the assembly when deflated whilst providing stable buoyancy when inflated. In one arrangement the upper wall portion is approximately twice as deep as the lower wall portion.

The skirt member and wall portions are preferably of flexible sheet material such as for example neoprene rubber or reinforced plastics and the attachment might conveniently be by seam welding.

The air pressurising hose and the wire member might conveniently be contained in their own tunnelled pockets provided by a doubling over of material in the top and bottom regions respectively of the skirt member.

Preferably the thickness of the air pressurising hose and the wire member are substantially equal and, either alone or with any immediate covering, exceeds the maximum thickness of the skirt member and wall portions assembled in a flat deflated condition. In such a design the deflated boom is readily stowable on a reel since the diameter of the stowed boom increases regularly by the thickness of the air hose/wire member thickness and sufficient space is found between the air hose and the wire member of each coil to accommodate any surplus material resulting from the flat packing and subsequent reeling. The invention also provides a boom as herein before described mounted on a reel with the air pressurising hose member in fluid connection with a source of air pressure whereby upon deployment of the boom from the reel and the initiation of the supply of air to the air pressurising hose member the buoyancy chambers will become inflated from their outer, ie first unreeled end.

Figure 2:
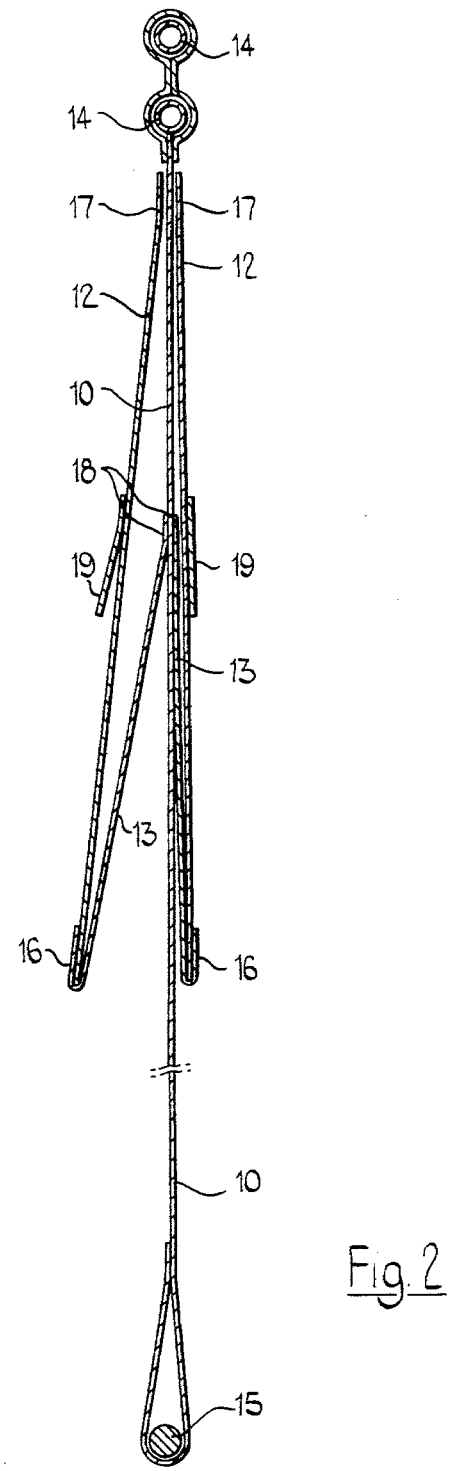
Figure 3:
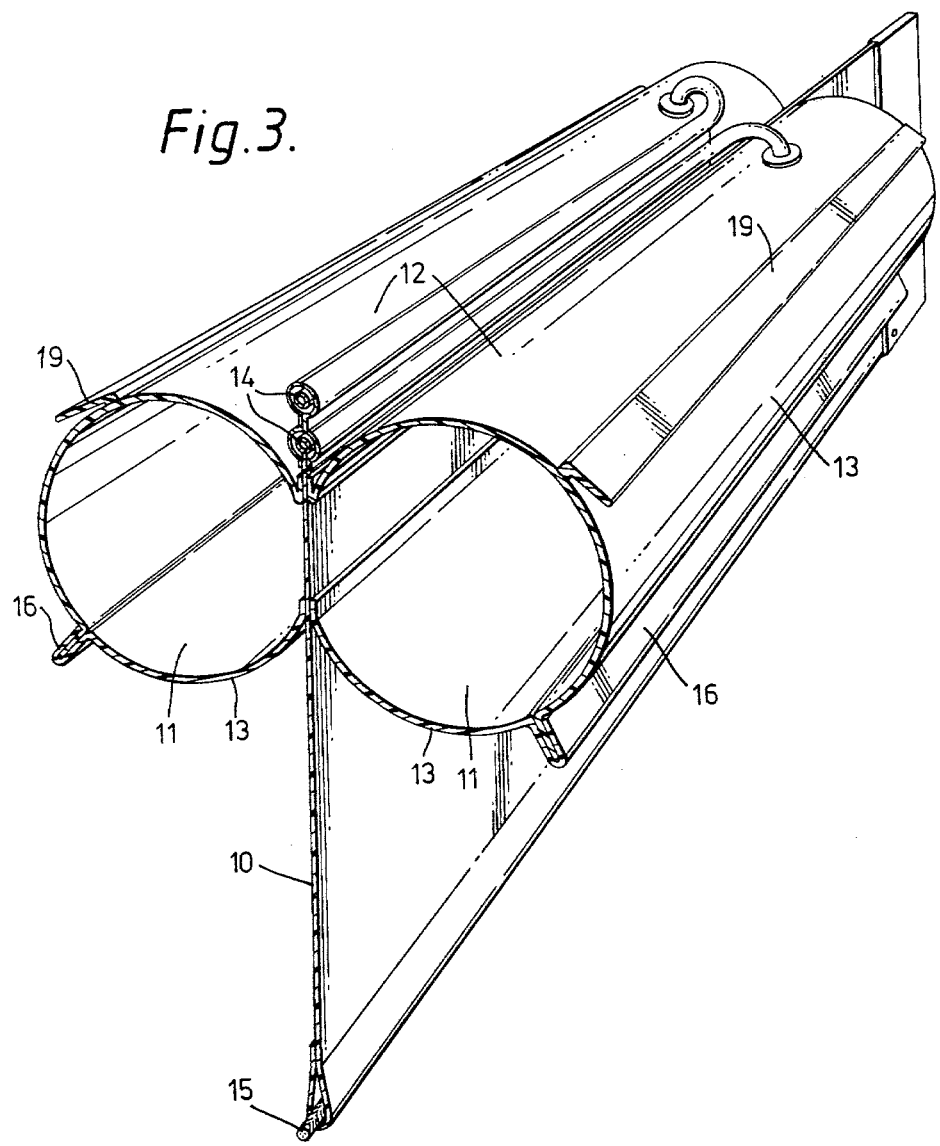

An embodiment of the invention will now be described by way of example only with reference to the accompanying drawings in which:

FIG. 1 shows the oil containment boom of the invention in the inflated conditon, FIG. 2 shows the boom of FIG. 1 in the deflated condition with the buoyancy chamber partially stowed on the left and fully stowed on the right, and FIG. 3 is a perspective view of one end of the inflated boom of the invention illustrating the connection of air hoses to the buoyancy chambers.

Referring to the Figures the oil containmentboom comprises a central skirt member 10 and air buoyancy chambers 11 each partially bounded by upper wall portions 12 and lower wall portions 13. Air pressurising supply hoses 14 and a flexible steel wire rope member 15 are located in doubled over pocket portions of the top and bottom respectively of the central skirt member 10.

The upper and lower wall portions 12 and 13 of each buoyancy chamber 11 are welded together to create extended stability keels 16 (see FIG. 1) whilst their opposite edges are welded to the skirt member 10 at points 17 and 18 respectively as shown. Wave deflection flaps 19 might be welded to the upper wall portions 12 to provide extra containment of waves. The approximate floatation water-line of the inflated boom is shown at 20.

The geometry of the boom design of the invention provides specifically for compact stowage on a reel and this feature is illustrated in FIG. 2. It will be seen that the lengths of the relative wall portions 12 and 13 and the nature of the welds is such that in a fully deflated condition they lie substantially flat against the central skirt member 10. This is shown particularly in the righhand side of the Figure. Furthermore, the air supply hoses 14 and the wire rope member 15 are each of such diameter that they at least equal or exceed the maximum thickness of the combined skirt member 10, welded joints 18, upper wall portion 12 and wave deflection flaps 19. With this arrangement the common problems of unwanted bulk in "wind-up" stowage systems is overcome since the diameter of the "wound-up" portion of the boom of the invention increases more quickly in the region of the air hoses 14 and wire rope 15 and therefore provides ample space there between to accommodate the puckering of surplus material usually experienced in such cases.

The stowable design of the invention was made possible by the realisation that a relatively light wire member, suitably tensioned in use, will perform as well as a conventional chain ballasted boom at water speeds up to those in excess of currents where oil dives beneath the skirt is typically in excess of one knot.

To enable the wire-tensioned boom to operate satisfactorily it was found that the flexible steel wire 15 needed to be attached to end plates which extend the full depth of the skirt member and which have a point of tow approximately one third of the vertical height between the skirt bottom and the floatation water-line 20 up from the bottom of the skirt member 10. This tow point position provided the right balance between the tension in the wire member 15 and the buoyancy effects of the chambers 11 under the influence of current. It was found experimentally that the skirt member 10 was most stable when the tow force was fed into the end plates through a specially designed tow-bar attached at one end to the bottom region of the end plate and at the other end to a point in the upper region of the end plate.

The use of a portable tow-bar also means that common end plates can be utilised, if necessary, for the joining together of two or more boom lengths. The boom may be of any desired practicable length, although as it is double chambered, sub-compartmenting is of less importance than in conventional booms. If sub-compartmenting of the boom is employed then each chamber 11 of each section of the boom would in use be inflated via an individual filling hose (not shown) branching out locally from the main air hoses 14. Inflation would always take place at the outer end of each member 11, as illusrated in FIG. 3.

A single air hose 14 could be used to inflate both chambers 11, the choice between single or double air hoses 14 being a design consideration based on the length of the boom, the cross-sectional area of the chambers 11, the air flow rate, capability and the desired inflation rate etc.

Trials have indicated that when a boom of the invention is stowed on a reel at the waters edge and fitted with its own inflation arrangements (utilised within the reel base) one man can pass the boom towing-off pendant to a boat and operate the inflation arrangements. The air hoses 14 will commence within the reel core, receiving air from an external source via a rotary gland fitted at the reel core axis. The air hoses 14 will proceed via about six or more initial turns round the core (in a special recess to leave a flat bed for the boom to be reeled over) before proceeding along the top pocket of the boom skirt member 10. As a result inflation of the boom can commence from the outer end as soon as boom unreeling begins. For re-stowing the inner end of each chamber 11 is provided with an air-tight screw plug for deflating each chamber. Combined with this plug is an over-pressure relief valve set to operate at 1-3 pounds above atmospheric pressure and thereby prevent damage through over inflation. With a powered reel a maximum of two men could re-stow the boom quite easily.

The complete reel base can be quickly road transported, and smaller versions (for use in rivers, docks and basins) may be trailer mounted with an integral glass reinforced plastics dinghy included for rapid deployment of the boom in shallow or confined waters.

The boom design tested was made from heavy grade reinforced plastics sheet seam welded with, refer FIG. 1, upper wall portions 12 of 27 inch unwelded length, lower wall portions 13 of 16 inches unwelded length and keel members 16 of 2 inches length. Welds at 17 and 18 were one inch long, the free length of skirt member 10 between welds 17 and 18 was 8 inches long and the skirt member 10 extended a further 22 inches below the bottom of weld 18. Air supply hoses 14 were of non-collapsible wire reinforced hose of approximately one inch outside diameter and the flexible steel wire rope 15 was also of one inch outside diameter. The wire rope 15 can conveniently be encased in a thin pvc tube.

It will be understood by those skilled in the art that the above description is of one specific embodiment of the invention and that modifications within the principle of double buoyancy, tension wire and special tow plates, are clearly possible. The substitution of a suitably designed tension wire for the traditional heavy and bulky ballast in known oil containment booms is also disclosed.

We claim:

1. An oil containment boom comprising double side by side buoyancy chambers, a central skirt member depending upwardly and downwardly from the buoyancy chambers, and having longitudinally extending upper and lower pockets accommodating respectively and air pressurising hose member communicating internally with the interior of said side by side buoyancy chambers and a wire member extending longitudinally of the boom.

2. An oil containment boom as claimed in claim 1 in which said at least one hose member includes a corresponding individual air pressurising hose member for each chamber.

3. An oil containment boom as claimed in claim 2 in which each air pressurising hose member is in fluid connection with its corresponding buoyancy chamber at the end of the corresponding chamber remote from the source of pressurising air.

4. An oil containment boom as claimed in claim 3 in which the skirt member extends over the full effective depth of the boom, the skirt member having an upper portion which provides a common separating wall between the buoyancy chambers.

5. An oil containment boom as claimed in claim 4 in which each buoyancy chamber is further bounded by discrete upper and lower wall portions which are attached together along their common peripheral edges to form a downwardly directed keel-like projection.

6. An oil containment boom as claimed in claim 5 in which the peripheral edge region of the upper and lower wall portions parallel to but remote from the keel-like projection are attached to the skirt member with their free edges extending towards the top of the skirt member so that with the chamber in the deflated condition the wall portions will lie naturally flat, or substantially so, relative to the skirt member.

7. An oil containment boom as claimed in claim 6 in which said pockets are provided by a doubling over of material in the top and bottom regions respectively of the skirt member.

8. An oil containment boom as claimed in claim 7 in which the air pressurising hose member and the wire member are of substantially equal diameter.

9. An oil containment boom as claimed in claim 8 mounted on a deployment reel with the air pressurising hose member in fluid connection with a source of air pressure whereby upon deployment of the boom from the reel and the initiation of the supply of air to the air pressurising hose member the buoyancy chambers will become inflated from their outer end.

10. An oil containment boom as claimed in claim 2 in which the skirt member extends over the full effective depth of the boom, the skirt member having an upper portion which constitutes a common separating wall between the buoyancy chambers.

11. An oil containment boom as claimed in claim 10 in which each buoyancy chamber is further bounded by discrete upper and lower wall portions which are attached together along their common peripheral edges to form a downwardly directed keel-like projection.

12. An oil containment boom as claimed in claim 11 in which the peripheral edge region of the upper and lower wall portions parallel to but remote from the keel-like projection are attached to the skirt member with their free edges extending towards the top of the skirt member so that with the chamber in the deflated condition the wall portions will lie naturally flat, or substantially so, relative to the skirt member.

13. An oil containment boom as claimed in claim 12 in which the air pressurising hose member and the wire member are of substantially equal diameter.

14. An oil containment boom as claimed in claim 12 mounted on a deployment reel with the air pressurising hose member in fluid connection with a source of air pressure whereby upon deployment of the boom from the reel and the initiation of the supply of air to the air pressurising hose member the buoyancy chambers will become inflated from their outer end.

15. An oil containment boom as claimed in claim 1 in which the air pressurising hose member is in fluid connection with the buoyancy chambers at the end of the chambers remote from the source of pressurising air.

16. An oil containment boom as claimed in claim 15 in which the skirt member extends over the full effective depth of the boom, the skirt member having an upper portion which constitutes a common separating wall between the buoyancy chambers.

17. An oil containment boom as claimed in claim 16 in which each buoyancy chamber is further bounded by discrete upper and lower wall portions attached together along their common peripheral edges to form a downwardly directed keel-like projection.

18. An oil containment boom as claimed in claim 17 in which the peripheral edge region of the upper and lower wall portions parallel to but remote from the keel-like projection are attached to the skirt member with their free edges extending towards the top of the skirt member so that with the chamber in the deflated condition the wall portions will lie naturally flat, or substantially so, relative to the skirt member.

19. An oil containment boom as claimed in claim 18 in which the air pressurising hose member and the wire member are of substantially equal diameter.

20. An oil containment boom as claimed in claim 19 mounted on a deployment reel with the air pressurising hose member in fluid connection with a source of air pressure whereby upon deployment of the boom from the reel and the initiation of the supply of air to the air pressurising hose member, the buoyancy chambers will become inflated from their outer end.

21. An oil containment boom as claimed in claim 1 in which the skirt member extends over the full effective depth of the boom, the skirt member having an upper portion which constitutes a common separating wall between the buoyancy chambers.

* * * * *

UNITED STATES PATENT AND TRADEMARK OFFICE
CERTIFICATE OF CORRECTION

PATENT NO. : 4,325,653
DATED : April 20, 1982
INVENTOR(S) : Teasdale

It is certified that error appears in the above—identified patent and that said Letters Patent is hereby corrected as shown below:

Claim 1, column 4, line 36, delete "and" and insert

--an--.

Signed and Sealed this

Third Day of August 1982

[SEAL]

Attest:

GERALD J. MOSSINGHOFF

Attesting Officer     Commissioner of Patents and Trademarks